United States Patent [19]
Leonard et al.

[11] 3,942,337
[45] Mar. 9, 1976

[54] TORQUE LIMITING DEVICE

[75] Inventors: Ralph R. Leonard, Kent; Ted J. Taylor, Seattle, both of Wash.

[73] Assignee: Industrial Analytics Inc., Kent, Wash.

[22] Filed: Sept. 16, 1974

[21] Appl. No.: 506,601

[52] U.S. Cl. ............................................. 64/29
[51] Int. Cl.² ......................................... F16D 7/06
[58] Field of Search ........................ 64/29; 192/56 R

[56] References Cited
UNITED STATES PATENTS

| | | | |
|---|---|---|---|
| 1,237,932 | 8/1917 | Marlin | 64/29 |
| 1,566,553 | 12/1925 | Maisch | 64/29 X |
| 2,400,712 | 5/1946 | Prather et al. | 64/29 X |
| 2,523,584 | 9/1950 | Miller | 64/29 |
| 2,576,069 | 11/1951 | Hoag et al. | 64/29 |
| 2,802,354 | 8/1957 | Bohnhoff et al. | 64/29 |
| 3,167,936 | 2/1965 | Engquist | 64/29 |
| 3,168,944 | 2/1965 | Livermont | 192/56 R |

FOREIGN PATENTS OR APPLICATIONS

| | | |
|---|---|---|
| 110,543 | Germany | 64/29 |

*Primary Examiner*—Allan D. Herrman
*Attorney, Agent, or Firm*—Conrad O. Gardner

[57] ABSTRACT

A torque limiting device employing a clutch disposed within a cylindrically shaped housing and coupling first and second members coaxially mounted in the respective ends of the cylindrically shaped housing. The first and second members are rotatably mounted in the housing and adapted for engagement with the torqueing device and work respectively or vice versa. Manual rotation of one housing section relative to the other housing section adjusts to predetermined maximum value the torque which is transmitted through the device, viz., between the first and second members.

5 Claims, 6 Drawing Figures

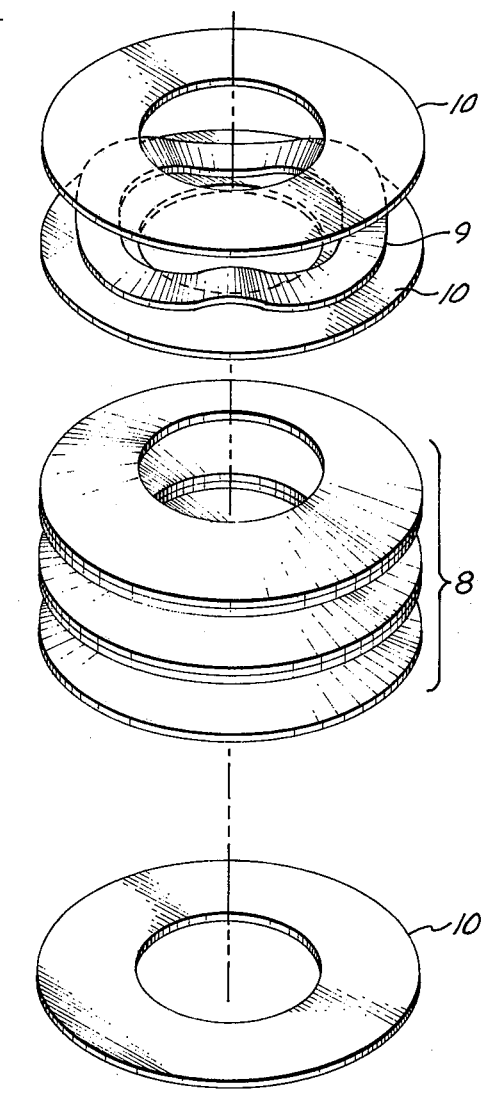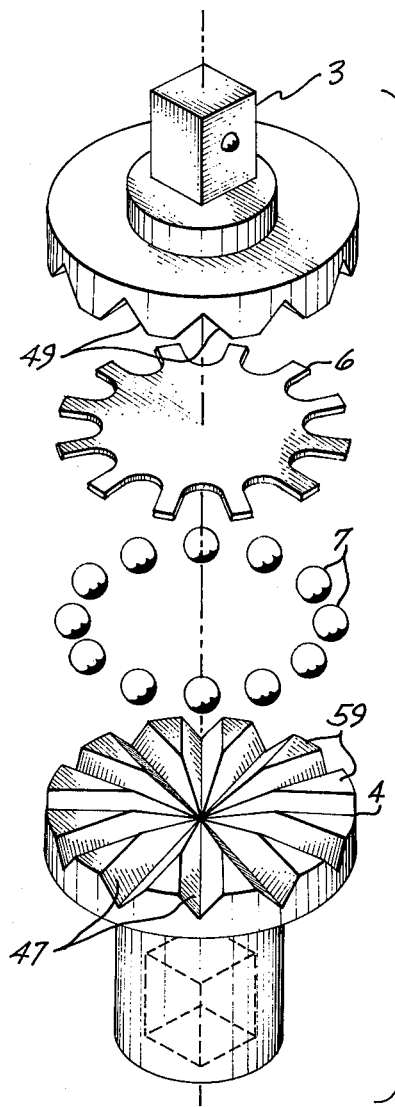

TORQUE LIMITING DEVICE

This invention relates to a torque limiting device and, more particularly, to such a device which is manually adjustable to the maximum torque desired and may be positioned by a mechanic between his ratchet handle and socket to prevent the application of excessive force to a nut, bolt, or other work.

The prior art including, e.g., U.S. Pat. No. 2,151,953 to Zimmerman, U.S. Pat. No. 2,250,736 to Torresen, and U.S. Pat. No. 3,691,826 to Graborac, show torque indicating, measuring, and limiting devices and may be contrasted to the present device which may be adjusted manually to a selected maximum torque by simple rotation of one section of the housing relative to the other section to a corresponding vernier setting between the housing sections.

Accordingly, it is an object of this invention to provide a compact, self-contained torque limiting device having a variable torque limit easily set by hand manipulation of the housing and which can be readjusted without uncoupling the device from the torqueing force driving it and the object being torqued.

It is another object of this invention to provide a torque limiting device which may be inserted between a torque transmitting source and a torque receiving device and which will limit torque in either a clockwise or counterclockwise direction.

It is a further object of this invention to provide a torque limiting device which incorporates repetitive reset when the torque limit set has been exceeded.

It is still another object of this invention to provide an adjustable torque limiting device wherein the torqueing force may be coupled at either end of the cylindrical housing with the work coupled to the opposite end.

It is yet another object of the present invention to provide an adjustable torque limiting device wherein the housing may be held fixed as by the hand of an operator while guiding the application of the torqueing force through the driven rotating member at one end of the housing to a receiving rotating member at the other end of the housing connected to the work.

According to the present invention the torque limiting device includes a clutch, the clutch members are coaxially disposed within a cylindrically shaped housing and one of said clutch members is fixed against axial movement within the housing while axial movement of the other clutch member away from said one of said clutch members is resisted by a compressive spring force which is adjustable to provide a corresponding torque limit by rotating one section of the cylindrically shaped housing a predetermined distance relative to the other section. A plurality of bearings are disposed in recesses formed between the opposing surfaces of the clutch members and when the applied torque slightly exceeds the selected compressive spring force, torque transmission momentarily ceases, while the bearings in the recesses in the surface of a clutch member move out and circumferentially a predetermined distance between recesses and into the next sequence of recesses on the clutch member, thereby providing automatic reset without exceeding the selected torque setting.

In a preferred embodiment the compressive spring force is provided by a stack of compression springs coaxially disposed about the central axis of the cylindrical housing and intermediate the clutch member disposed for axial movement and an inner end wall of said cylindrical housing.

The present invention will be further described by way of example with reference to the accompanying drawings in which:

FIG. 3 is an exploded isometric view of the internal clutching mechanism portion of the device shown in FIG. 2;

FIG. 4 shows an exploded isometric view of the spring assembly for generating compressive spring forces in the device shown in FIG. 2;

Figure 1:
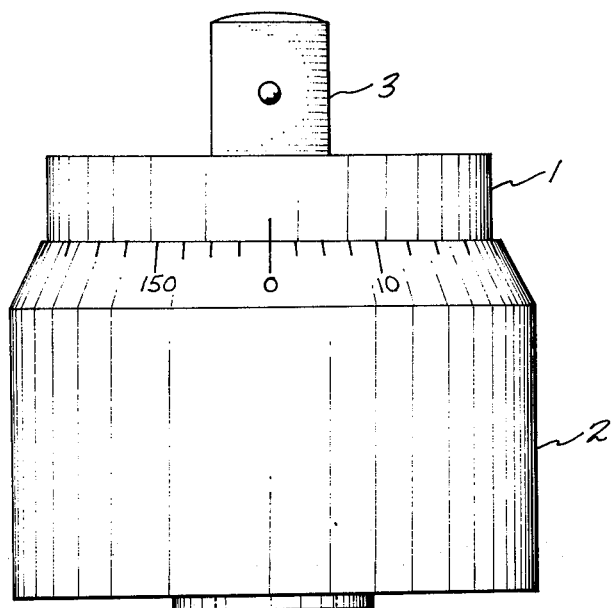
FIG. 1 is a front elevational view of a torque limiting device in accordance with an embodiment of the present invention.
Figure 2:
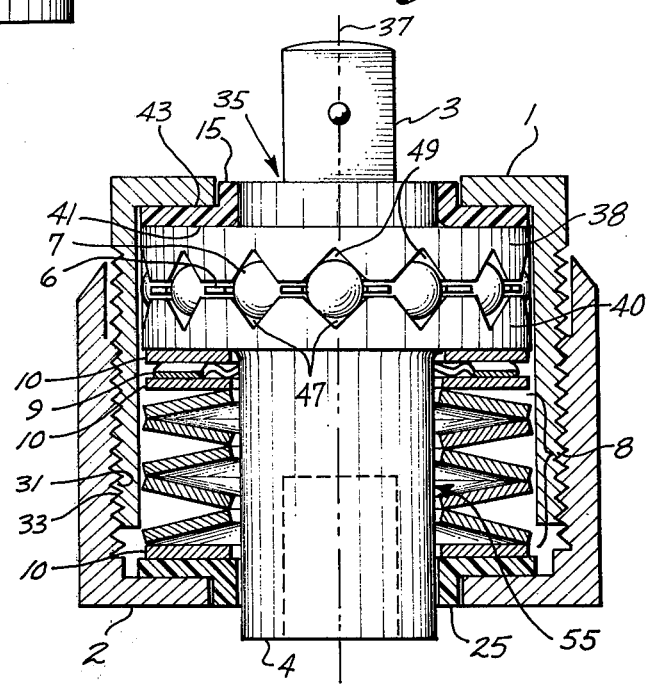
FIG. 2 is a front elevational view partially in section of the embodiment shown in FIG. 1.

Turning now to FIG. 1, the cylindrically shaped housing for the device is seen to comprise a first cup shaped section 1 having an outer threaded surface 31 (see FIG. 2) on the cylindrical portion thereof which is rotatably supported within the overlying mating inner threaded surface 33 of second cup shaped section 2. A first member 35 disposed coaxially about the central axis 37 of the device is shaped at one end into a conventional socket engaging stud 3 projecting from the end of cylindrically shaped housing section 1 while the other end of first member 35 within cylindrical housing section 1 includes a first disk shaped clutch member 38 which clutch member is fixed against axial movement since at least a certain minimal force is exerted at all times as hereinafter described by the opposing face surface of second clutch member 40 against bearings 7 pressing on the face surface of first clutch member 38. Actually, briefly in passing, wave spring 9 sandwiched between washers 10 as seen in FIG. 2 (and in more detail in FIG. 4) exerts a small compressive force through second clutch member 40 and bearings 7 against the face of clutch member 38 so that all bearing 7 surfaces remain in physical contact with the opposing surfaces of both clutch members 38 and 40 throughout the adjustable torque limiting range of the device. A bushing 15 of a material exhibiting low frictional properties which is seated in the end of cylindrical housing section 1, surrounds first member 35 permitting easy rotation thereof and prevents axial movement of clutch member 38 due to the aforementioned small compressive force against the face thereof which is resisted by the portion of bushing 15 extending between the outer face 41 of clutch member 38 and the inner end wall 43 of cylindrical housing section 1. Second member 55 has a second disk shaped clutch member 40 terminating one end thereof within the cylindrical housing, and the other end 4 exposed through the bottom of cylindrical housing section 2 is rotatingly supported similarly as member 35 by a bushing 25 which is adapted to receive the socket engaging stud of a conventional socket wrench.

It can be noted from an observance of parts making up the torque limiting device within the cylindrically shaped housing as shown in FIG. 2 that the clutch assembly includes a pair of clutch members 40 and 38 having opposing driving faces containing recesses 47 and 49 respectively (see also FIG. 3) which are separate particularly formed recesses (V-shaped slots in the configuration shown) extending radially and equiangularly displaced around the circumference of the facing surfaces of the respective disk shaped clutch members, one face surface being the mirror image of the other in this particular embodiment. There are twelve V-shaped slots in each clutch member face surface and twelve ball type bearings 7 distributed one in each slot. A spacer, member 6, (seen in more detail in FIG. 3) disposed between the opposing face surfaces of clutch members 38 and 40 and having a plurality of slots equal to the number of bearings (here twelve) around the periphery thereof is required to maintain the proper positioning of ball bearings 7. Its purpose is to fix the radial distance of the bearings 7 from the center of the disk shaped clutch members 38 and 40 so that the bearings may be stepped over a surface area 59 between slots negotiated upon reaching the torque limit set and to thereby enable proper recycling of the device. While a particular form of recesses 47 and 49 (V-shaped slots) are shown and bearings cooperating therewith, another shape bearing could require another slot configuration and might be utilized. An exploded view of the internal clutching mechanism of the device of FIG. 2 showing parts in isometric deemed helpful in further identifying the internal working parts is shown in FIG. 3.

The compressive force to urge a closing of the gap or spacing between clutch members 38 and 40 is provided principally by a spring assembly comprising a stack 8 of compression springs with a minimal force as hereinbefore mentioned provided by wave spring 9. Turning now to the spring assembly of FIG. 4, it will be noted that wave spring 9 is inserted between washers 10 while the stack 8 includes a plurality (in the example shown 6) of conical washers disposed between washers 10, and another common washer 10 being utilized between the wave spring 9 and the top of the stack 8.

Figure 5:
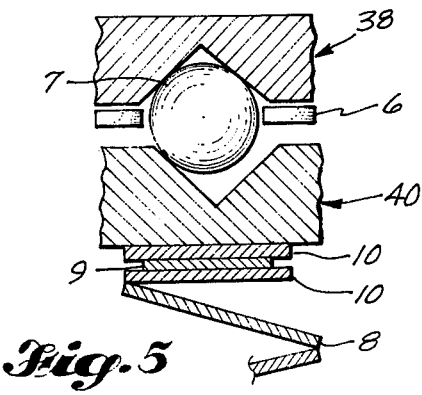
FIG. 5 is a view taken in section of a portion of the clutch mechanism shown in FIG. 2 showing the disposition of the parts for the condition of minimum torque limit setting.
Figure 6:
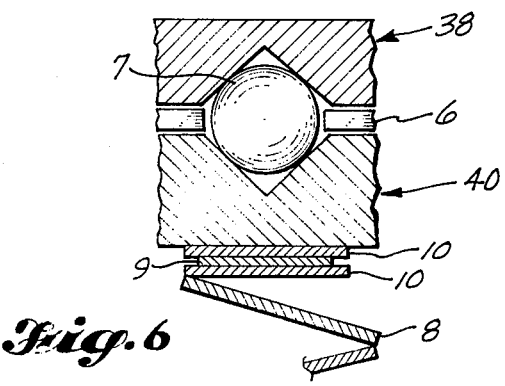
FIG. 6 is a view taken in a section of a portion of the clutch mechanism shown in FIG. 2, however, showing the disposition of the parts for the condition of a maximum torque limit setting.

FIGS. 5 and 6 are deemed helpful in understanding the operation of the device shown in FIG. 2 under minimum and maximum adjusted torque limit settings respectively. These figures show the relative position of clutch members 38 and 40 after the initial application of sufficient torque required to flatten wave spring 9. FIG. 5 shows the relative position of clutch members 38 and 40 and bearing 7 with respect thereto for minimum torque setting and consequent minimum compression of stack 8 urging upward to close the gap between the opposing facing surfaces of clutch members 38 and 40 while FIG. 6 shows the relative position of parts for maximum torque limit setting of the device. The minimum and maximum settings set the gap between opposing face surfaces of clutch members 38 and 40. The extent of this distance between opposing face surfaces determines the height of the full depth of a recess that a bearing 7 has to negotiate prior to clearing slots, e.g., 47 (see FIG. 3) and passing over the surface area 59 between the tops of adjacent slots. Reduction of the distance between opposing surfaces of clutch members 38 and 40 (as shown in FIG. 6) results in a larger slot depth which must be negotiated (the device has "bounced its clutch") by bearing 7 against the higher compressive forces provided by adjustment of the amount of compression of stack 8.

Turning now to an understanding of the manner of operation of the device and making reference to FIGS. 1 and 2, it will be noted that a torque is applied through the handle of the customary mechanics ratchet wrench (not shown) which has the stud thereof inserted in the female receptacle in end 4, which torque also turns socket engaging stud 3 at the same rate of speed and in unison with end 4 while the operator holds outer cylindrical housing sections 1 and/or 2, since bearings 7 retain slots 47 opposite slots 49. An increasing resistance to the aforementioned turning is transmitted to stud 3 by the item being tightened and wave spring 9 is first flattened with clutch member 40 thus increasing the gap between opposing facing surfaces of clutch members 40 and 38. In the case of the minimum transmittable torque setting on the circumferential scale inscribed on cylindrical housing section 1 or 2 (shown here on section 2) with respect to the hairline on the opposing cylindrical housing (shown here on section 1) stack 8 is under minimum compression with only leaf spring 9 compressed thereby allowing bearings 7 to almost clear the top of the V-shaped recesses 47 as shown in detail in this condition in FIG. 5 and thus the minimal amount of torque only applied against a minimum compressive force on stack 8 clears bearings 7 to the next recesses thus recycling the torque limiting device. In the case of maximum torque limiting setting with less than 360° of rotation (one revolution) between cylindrical housing sections 1 and 2 from the minimum torque setting, the compressive force on stack 8 is at a maximum to urge the clutch members together to provide a minimum gap therebetween as shown in FIG. 6 which maximum compressive force must be overcome by the opposing resistive force supplied from the work piece through stud 3 and clutch member 38 to the bearings 7 before bearings 7 can travel out of their respective slots to negotiate the next slots in similar manner against a gap provided there again by the preset compressive forces of stack 8. This recycling continues as long as the applied torque continues to exceed the selected torque limit. The torque limiting function is provided by the present device independent of the direction of the applied torque, e.g., clockwise or counterclockwise.

In a specific working embodiment of the present torque limiting device adopted for use with a ½ inch drive ratchet handle, the cylindrical housing comprising the two cylindrically shaped sections had a diameter of about 2¼ inches and a length of about 2¼ inches, and the self-contained torque limiting device operated over a useful range of 50 – 200 ft. lbs. torque. For a ⅜ inch drive mechanics ratchet handle and a ¼ inch drive handle, the present cylindrically shaped housing would be relatively smaller, and developing correspondingly less torque. The device may be designed in accordance with the above teachings for various other torque limiting spectra by varying the size of the housing to accommodate compressive spring means having, e.g., a stack 8 containing a different number of compression springs. The present torque limiting device, since similar in size and appearance to a socket in a mechanics socket set may be stored in housings holding such sockets conventionaly, utilized between ratchet handle and sockets in the set, and adjusted by a simple vernier setting between cylindrical housing sections to a reading in ft. lbs. torque.

What is claimed is:

1. A torque limiting device comprising in combination:

a cylindrically shaped housing comprising first and second cup shaped sections, said first cup shaped section having an outer threaded surface around the lip portion thereof, and said second cup shaped section having a mating internal thread around the lip porition thereof, said first section rotatable relative to said second section about the axis of said cylindrical housing;

first and second shafts disposed along the axis of said cylindrical housing, said first shaft rotatably supported in the bottom of said first cup shaped section, and said second shaft rotatably supported in the bottom of said cup shaped second section;

a clutch assembly disposed in said housing and interconnecting said first and second shafts, said clutch assembly including two clutch members operative to separate and break the interconnection between said first and second shafts when the torque resistance to rotation of said first or second shaft exceeds a predetermined level; and, said rotation of one of said cup shaped sections relative to the other providing adjustment of the gap between said two clutch members.

2. A torque limiting device having means for selecting any torque limit value between minimum and maximum torque limit capabilities of said device comprising:

an input shaft adapted for transmission of torque by means of a supplemental torqueing tool;

an output shaft adapted for coupling to a workpiece;

a housing surrounding said input and output shaft, said housing comprising first and second sections, one of said sections rotatable relative to the other section;

a clutch assembly disposed in said housing and interconnecting input and output shafts, said clutch assembly including two clutch members operative to separate and break the interconnection between said input and output shafts when the torque resistance to rotation of said input or output shaft exceeds a preselected torque limit value;

compressive spring means within said housing responsive to hand rotation of one of said housing sections relative to the other for providing a compressive force through a first of said two clutch members against the second of said two clutch members throughout the adjustable torque limiting range of said device; and, further including a compressive spring assembly within said housing for resisting separation of the variable gap existing between said two clutch members when the applied torque is transmitted by said input shaft to said output shaft.

3. A torque limting device comprising:

first and second clutch members having facing surfaces;

a two section cylindrical housing have one part rotatable relative to the other for increasing or decreasing the variable gap which exists between the facing surfaces of said first and second clutch members when applied torque is transmitted through the device;

compressive spring means disposed within said housing responsive to hand rotation of one of said two housing sections relative to the other for providing a compressive force through a first of said two clutch members against the second of said two clutch members throughout the adjustable torque limiting range of said device; and, further including a compressive spring assembly disposed within said housing for resisting separation of the variable gap between said two clutch members when the applied torque is transmitted through said device.

4. A torque limiting device having means for selecting any torque limit value between minimum and maximum torque limit capabilities of said device comprising:

an input shaft adapted for transmission of torque by means of a supplemental torqueing tool;

an output shaft adapted for coupling to a workpiece;

a two section housing surrounding said input and output shafts, one of said two sections rotatable relative to the other for controlling the variable gap between the facing surfaces of first and second clutch members when applied torque is transmitted through said device;

said first and second clutch members fixed to said input and output shafts respectively, and said clutch members disposed within said two section housing;

a wave spring coaxially disposed about the central axis passing through said input and output shafts of said device, said wave spring responsive to hand rotation of said one of said housing sections relative to the other for providing a compressive force through a first of said two clutch members against the second of said two clutch members throughout the adjustable torque limiting range of said device; and, a plurality of conical shaped spring washers coaxially disposed about said central axis for providing compressive spring force for resisting separation of the variable gap between said two clutch members when the applied torque is transmitted through the device.

5. A torque limiting device having a two section housing, one of said two sections hand rotatable relative to the other section for adjusting the torque limit to a selected value, said device further including:

a clutch assembly comprising a pair of clutch members disposed within said housing, said clutch members operative to separate the variable gap therebetween and break the interconnection between input and output shafts connected to said clutch members respectively when said selected torque limit is exceeded;

a first spring means comprising a spring disposed within said housing and responsive to hand rotation of one of said housing sections relative to the other for providing a compressive force through a first of said two clutch members against the second of said two clutch members throughout the adjustable torque limiting range of said device; and further, second spring means comprising a plurality of conical shaped spring washers coaxially disposed within said housing for resisting separation of the variable gap existing between said two clutch members when applied torque is transmitted through said device.

\* \* \* \* \*